United States Patent
Brownholtz et al.

(10) Patent No.: US 7,356,772 B2
(45) Date of Patent: Apr. 8, 2008

(54) MULTI-COLUMN USER INTERFACE FOR MANAGING ON-LINE THREADED CONVERSATIONS

(75) Inventors: Elizabeth A. Brownholtz, Andover, MA (US); Werner Geyer, Boston, MA (US); Bernard J. Kerr, Boston, MA (US); David R. Millen, Boxford, MA (US); Michael Muller, Medford, MA (US); Eric M. Wilcox, Winchester, MA (US); Andrew J. Witt, Somerville, MA (US)

(73) Assignee: International Business Machines Corporation, Armonk, NY (US)

( * ) Notice: Subject to any disclaimer, the term of this patent is extended or adjusted under 35 U.S.C. 154(b) by 733 days.

(21) Appl. No.: 10/722,014

(22) Filed: Nov. 25, 2003

(65) Prior Publication Data

US 2005/0114781 A1 May 26, 2005

(51) Int. Cl.
   *G06F 3/00* (2006.01)
(52) U.S. Cl. .................... 715/752; 715/758; 715/855
(58) Field of Classification Search ................ 715/758, 715/752, 753, 853–855; 709/206
   See application file for complete search history.

(56) References Cited

U.S. PATENT DOCUMENTS

| | | | | |
|---|---|---|---|---|
| 5,793,365 | A | * | 8/1998 | Tang et al. ................. 715/758 |
| 6,484,196 | B1 | * | 11/2002 | Maurille ..................... 709/206 |
| 6,546,417 | B1 | * | 4/2003 | Baker ......................... 709/206 |
| 7,003,724 | B2 | * | 2/2006 | Newman ..................... 715/526 |

* cited by examiner

*Primary Examiner*—Ba Huynh
*Assistant Examiner*—Kim-Lynn Dam
(74) *Attorney, Agent, or Firm*—Juliet Gresham-Moran; Hoffman, Warnick & D'Alessandro LLC

(57) ABSTRACT

The present invention provides a user interface that includes a first column for chronologically displaying a set of messages (objects) in a conversation, and a second column for displaying a branch of messages (objects) corresponding to a message (object) selected in the first column. The user interface further includes, among other things, a list of participants to the conversation, a vertical index (time line), a list of related conversations and a conversation map that illustrates a hierarchy of the conversation. Each message (object) in the first column can have an associated indicator for indicating a quantity of predecessors and successors to the set of messages (objects), as well as an in-line reply button for replying to the set of messages. Each of the messages displayed of the second column can have one or more associated navigation buttons for navigating adjacent hierarchical levels.

40 Claims, 8 Drawing Sheets

MULTI-COLUMN USER INTERFACE FOR MANAGING ON-LINE THREADED CONVERSATIONS

BACKGROUND OF THE INVENTION

1. Field of the Invention

In general, the present invention relates to a multi-column user interface for managing on-line threaded conversations that are based on collections of objects having both hierarchical and temporal relationships such as threaded chats, discussions, newsgroups, etc. Specifically, the present invention provides an interface for efficiently navigating and contributing with respect to a threaded conversation.

2. Related Art

On-line threaded discussions or conversations (e.g., in electronic mail, news groups, Internet chats, discussion databases, etc.) have gained increasing popularity. In general, threaded conversations allow multiple parties to communicate about and collaborate around any number of topics. A threaded conversation typically comprises numerous discussion streams or branches of messages. Branches are usually created by replying to an existing message. Typically, threaded conversations are visualized in a hierarchical manner. To this extent, existing solutions to navigate about a threaded conversation either use indentation of messages to display the hierarchical structure, or provide thread maps that show the hierarchy in a tree-like visualization (or similar). Users can generally select (i.e., click) on individual items in the map to read or reply to certain messages.

Unfortunately, with the existing technology, there are several major issues. First, the hierarchical visualization makes it difficult to navigate about and read a single conversation branch with its reply structure. For example, if a user reads through the entire reply chain of messages in an indented visualization, he/she could easily get lost, especially if the conversation "forks out." In addition, it can be extremely difficult to step back through a given conversation. Specifically, if thread maps are used, it is cumbersome to open up all of the messages that belong to one conversation branch. The user cannot simply read through them in the order of posting without interrupting his/her reading. Still yet, the hierarchical visualization currently provided makes it difficult to discover new messages posted to the conversation since they are typically scattered throughout the hierarchy.

Another issue with existing technology occurs with sequential or temporal visualizations, for example in a "chat" view. The "chat" view arranges messages in a strictly temporal sequence. In this technology, it is often difficult to follow the logical sequence of an idea, because the replies related to that idea appear interspersed with other messages on other topics that happen to have occurred at intermediate times between the replies on the topic of interest. As in the previous case, it is again difficult to discover new messages posted on the topic of interest, because they may be interspersed with new messages on other topics. Further, in the "chat" technology, any message that the user wishes to add related to a specific topic must be added at the end of the stream of messages, even if other, unrelated messages have appeared after the last message on the topic of interest. Thus, the user's own new message is subject to the same problems as all of the other messages in the chat (i.e., the message will appear in strict temporal order, and thus may not appear close to the other messages to which it is topically related.)

Still another issue with existing technology is that conversations are assumed to consist of text only, as in an instant message session or chat, or a discussion database. Yet for many concepts another representation means may be more convenient, expressive, or appropriate. For exemplary purposes, financial data may be better communicated in the form of a spreadsheet, and graphical design may be better communicated in the form of an image. Existing technologies that support conversations provide means for constructing a sequence or a hierarchical tree of text objects, and require that non-text objects (for example, but not limited to, spreadsheets, images, links to other documents or websites) be provided as attachments or inclusions in the default text object. This is an inconvenient and limiting default which makes non-text objects more difficult to add, and more difficult to understand, in both sequential message streams or in hierarchical trees.

In view of the foregoing, there exists a need for a user interface for managing an on-line threaded conversation that is not subject to the strictly-topical or strictly-temporal limitations described above. Specifically, a need exists for a user interface that allows users to easily view and navigate about the various branches of a threaded conversation. A further need exists for the interface to provide a conversation map that illustrates a hierarchy of the conversation and aids in navigating the hierarchy. An additional need exists for the user interface to include features such as navigation buttons, a list of participants and a list of related conversations to make managing, navigating, and contributing to the conversation more efficient. Moreover, a need exists for the user interface to not limit components of a conversation to text messages, but allows any type of object (files, links, images, etc.) that can be viewed and worked within the user interface.

SUMMARY OF THE INVENTION

In general, the present invention provides a multi-column user interface for managing an on-line threaded conversation. Specifically, the user interface includes a first column for chronologically displaying a set of messages (objects) in a conversation, and a second column for displaying a branch of messages corresponding to a message (object) selected in the first column. The user interface further includes, among other things, a list of participants in the conversation, a vertical index (time line), a list of related conversations and a conversation map that illustrates a hierarchy of the conversation. Each message (object) in the first column can have an associated indicator for indicating a quantity of predecessors and successors to the set of messages (objects), as well as an in-line reply button for replying to the set of messages. In addition, each of the messages (objects) displayed in the second column can have one or more associated navigation buttons for navigating about adjacent hierarchical levels.

A first aspect of the present invention provides a multi-column user interface for managing threaded on-line conversations, comprising: a first column for chronologically displaying a set of messages in a conversation; and a second column for displaying a branch of messages corresponding to a message selected in the first column.

A second aspect of the present invention provides a multi-column user interface for managing threaded on-line conversations, comprising: a first column for chronologically displaying a set of messages in a conversation; and a second column for displaying a branch of messages corresponding to a message selected in the first column, wherein each message in the branch of messages includes navigation buttons for navigating about adjacent hierarchical levels of the branch of messages.

A third aspect of the present invention provides a program product stored on a recordable medium, which when executed, comprises program code for generating a multi-column user interface for managing threaded on-line conversations, wherein the multi-column user interface includes a first column for chronologically displaying a set of messages in a conversation, a second column for displaying a branch of messages corresponding to a message selected in the first column.

A fourth aspect of the present invention provides means for representing not only text messages, but also diverse representations of other objects, as components of the multi-column user interface, wherein these other objects (such as files, links, etc.) may be viewed or worked on directly in the threaded on-line conversation, and may optionally be opened and modified by any of the participants in that conversation.

Therefore, the present invention provides a multi-column user interface for managing an on-line threaded conversation.

BRIEF DESCRIPTION OF THE DRAWINGS

These and other features of this invention will be more readily understood from the following detailed description of the various aspects of the invention taken in conjunction with the accompanying drawings in which.

Figure 1:
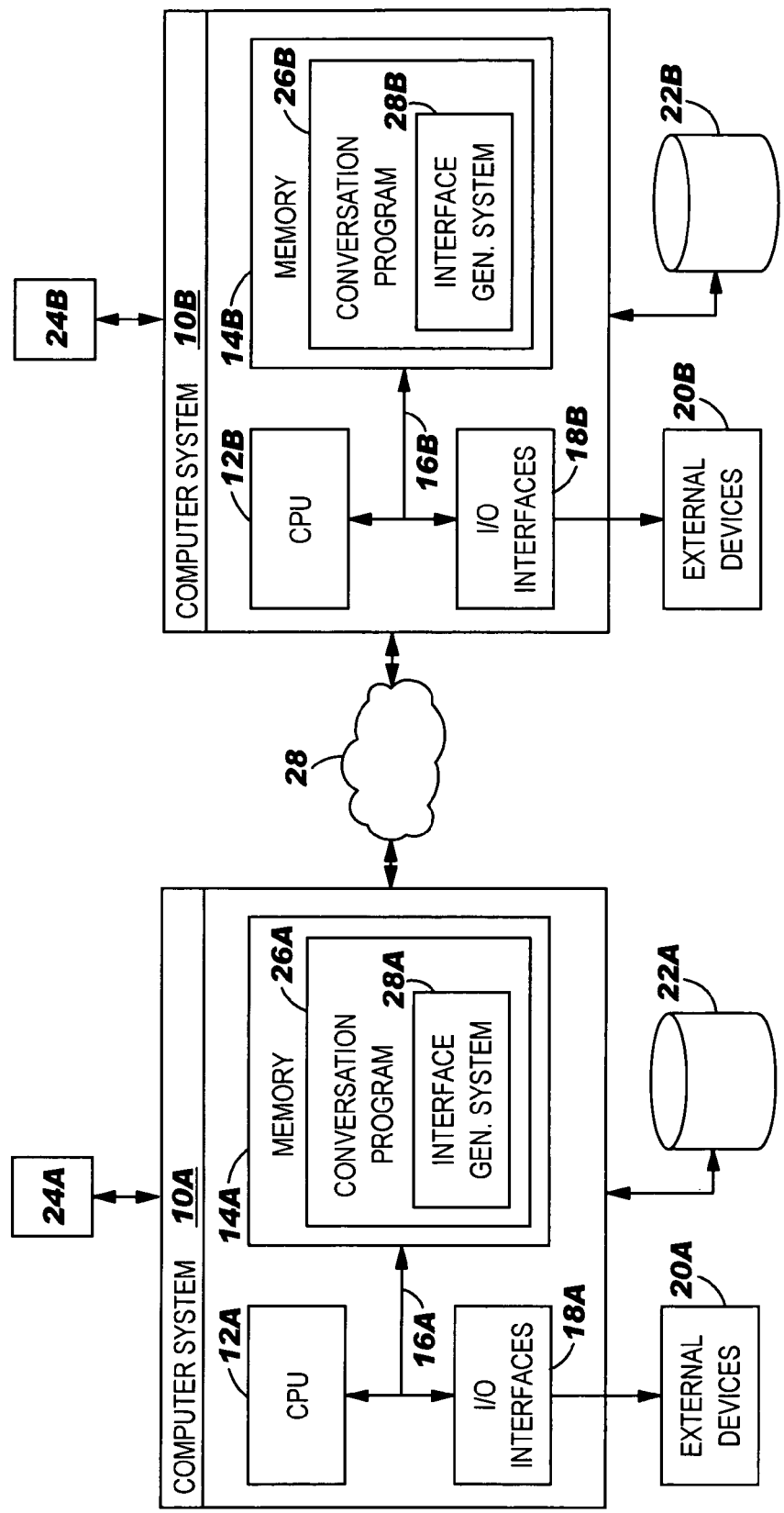
FIG. 1 depicts a computer system having an on-line conversation program capable of generating a user interface according to the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a multi-column user interface for managing an on-line threaded conversation. Specifically, the user interface includes a first column for chronologically displaying a set of messages in a conversation, and a second column for displaying a branch of messages corresponding to a message selected in the first column. The user interface further includes, among other things, a time line of the conversation, a list of participants in the conversation, a list of related conversations and a conversation map that illustrates a hierarchy of the conversation. Each message in the first column can have an associated indicator for indicating a quantity of predecessors and successors to the set of messages, as well as an in-line reply button for replying to the set of messages. In addition, each of the messages displayed in the second column can have one or more associated navigation buttons for navigating about adjacent hierarchical levels.

In the following description, the term "message" is used to refer to a posting in a conversation that is not limited to text only. Rather, the "message" can comprise any type of content (e.g., images, files etc.) that is used in a threaded conversation.

Referring now to FIG. 1, illustrative computer systems 10A-B are depicted. In general, computer systems 10A-B are intended to represent any type of computerized devices capable of conducting on-line threaded conversations with each other over a network 28. For example computer systems 10A-B could be personal computers, workstations, laptops, hand-held devices. Moreover, computer systems 10A-B could be clients or servers. Regardless, network 28 can represent any type of network such as the Internet, a local area network (LAN), a wide area network (WAN), a virtual private network (VPN), etc. As such, communication between computer systems 10A-B could occur via a direct hardwired connection (e.g., serial port), or via an addressable connection that may utilize any combination of wireline and/or wireless transmission methods. The computer systems 10A-B may utilize conventional network connectivity, such as Token Ring, Ethernet, WiFi or other conventional communications standards. Moreover, connectivity could be provided by conventional TCP/IP sockets-based protocol. In this instance, the computer systems 10A-B could utilize an Internet service provider to establish connectivity. It should be understood that additional participants/computer systems could be part of a conversation with computer systems 10A-B and participants 24A-B. Accordingly, the architecture shown in FIG. 1 is not intended to be limiting.

In any event, computer systems 10A-B generally comprise central processing units (CPUs) 12A-B, memories 14A-B, buses 16A-B, input/output (I/O) interfaces 18A-B, external devices/resources 20A-B and storage units 22A-B. CPUs 12A-B may comprise a single processing unit, or be distributed across one or more processing units in one or more locations, e.g., on a client and computer system. Memories 14A-B may comprise any known type of data storage and/or transmission media, including magnetic media, optical media, random access memory (RAM), read-only memory (ROM), a data cache, etc. Moreover, similar to CPUs 12A-B, memories 14A-B may reside at a single physical location, comprising one or more types of data storage, or be distributed across a plurality of physical systems in various forms.

I/O interfaces 18A-B may comprise any system for exchanging information to/from an external source. External devices/resources 20A-B may comprise any known type of external device, including speakers, a CRT, LCD screen, handheld device, keyboard, mouse, voice recognition system, speech output system, printer, monitor/display, facsimile, pager, etc. Buses 16A-B provides a communication link between each of the components in computer systems 10A-B and likewise may comprise any known type of transmission link, including electrical, optical, wireless, etc.

Storage units 22A-B can be any systems (e.g., databases) capable of providing storage for data. As such, storage units 22A-B could include one or more storage devices, such as a magnetic disk drive or an optical disk drive. In another embodiment, storage units 22A-B includes data distributed across, for example, a LAN, a WAN or a storage area network (SAN). Further, although not shown, additional components, such as cache memory, communication systems, system software, etc., may be incorporated into computer systems 10A-B.

Shown within memories 14A-B of computer systems 10A-B are conversation programs 26A-B. In general, conversation programs 26A-B are intended to represent any type of programs that foster on-line conversations between participants 24A-B. For example, conversation programs 28A-B could be instant messaging or chat programs, news group programs, etc. Under the present invention, conversation programs 26A-B include interface generation systems 28A-B that generate a multi-column user interface for managing on-line threaded conversations between participants 24A-B.

Figure 2:
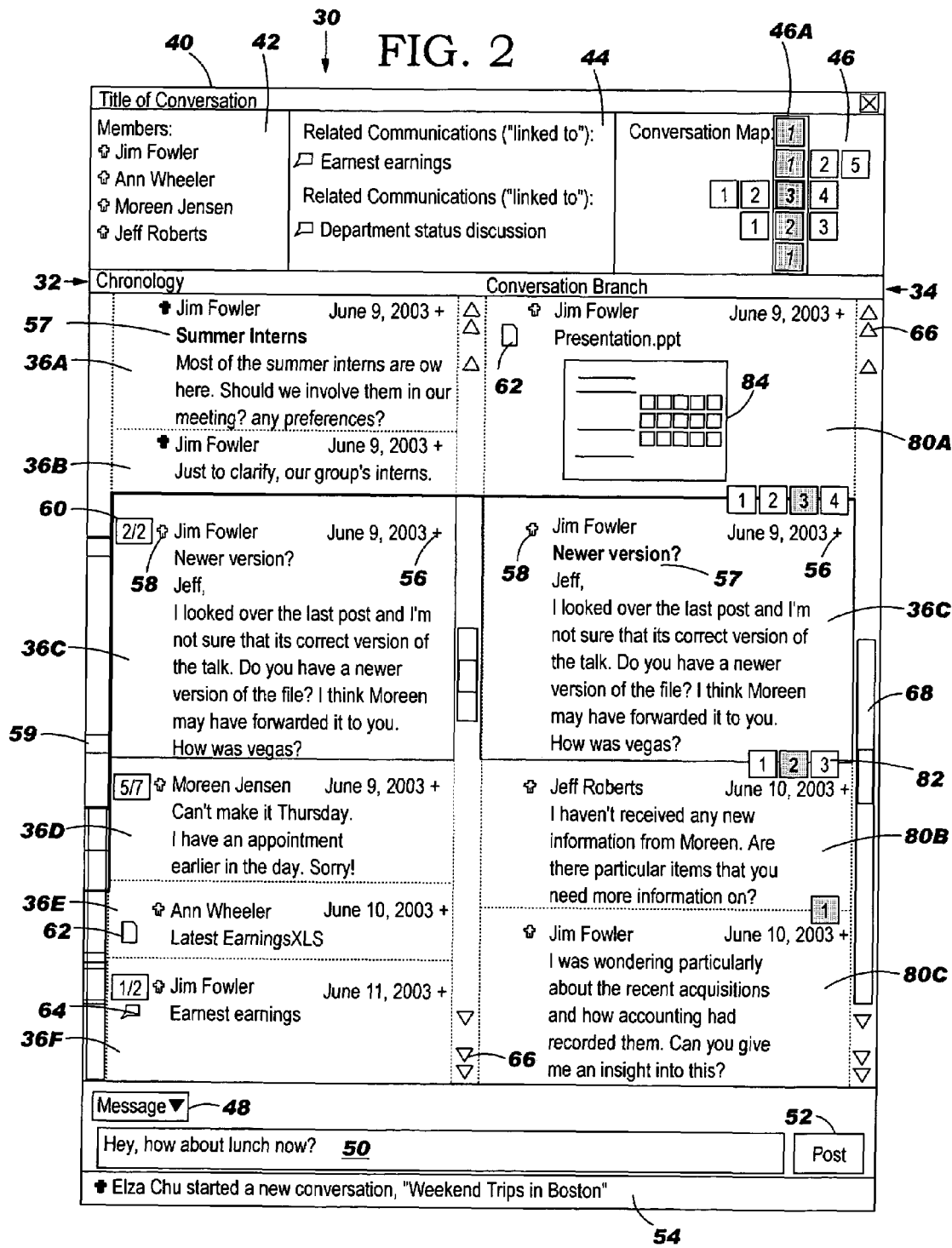
FIG. 2 depicts an illustrative multi-column user interface for managing on-line threaded conversations according to the present invention.

Referring now to FIG. 2, an illustrative multi-column user interface 30 according to the present invention is shown. In general, user interface 30 allows an on-line threaded conversation between multiple participants to be effectively managed. As shown, user interface 30 includes two or more columns such as columns 32 and 34 (which will be further described below), a title field 40 for providing a title to the conversation, a list of participants 42 in the conversation, a list of related conversations 44 that might be linked to or from the current conversation, a conversation map 46 for illustrating and navigating a hierarchy of messages in the conversation, a menu 48 for selecting an message object type for a new message object to be posted, an input field 50 for inputting text for a new message object, a post button 52 for posting inputted text as a new message and an alert box 54 for alerting participants of new developments.

Column 32 chronologically displays a set of messages 36A-F in the conversation between the various participants shown in list 42. That is, column 32 displays all messages between conversation participants in the order in which they were posted. As can be seen from messages 36A-F, the conversation can have multiple topics/branches. For example, messages 36A-B discuss summer interns, while message 36C discusses a "talk" or presentation that is to be given. Typically, each message 36A-F is displayed in a separate "message" region and can have several associated features. For example, each message 36A-F could be represented by a message name and could have an associated in-line reply button 56 for replying to a specific message, an author icon 58 for indicating a specific participant responsible for posting the message (the icon can also indicate the status of the participant), a content type icon 62 or 64 indicating the type of posted object (see e.g. message 36E or 36F), and an indicator 50 for indicating a quantity of corresponding hierarchical predecessor and successor messages. For example, the indicator 60 for message 36C is "2/2.". This indicates that message 36C has two predecessor messages and two successor messages (i.e., pertaining to the "talk" or presentation) in its branch. The number of successor messages can be calculated in various ways. For example, the number could be the total number of children and grandchildren of a given message, the number of direct children of a message, or the number of subsequent generations in the thread. FIG. 2 indicates the number of subsequent generations as successors. This can be more clearly seen from conversation map 46, which is shown in expanded form in FIGS. 3A-B.

Figure 3A:
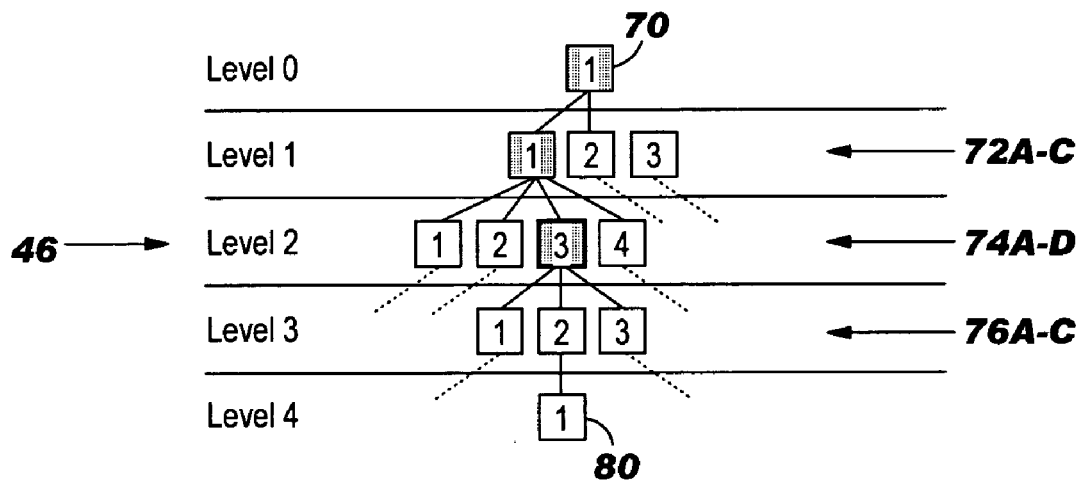
FIG. 3A illustrates contents of the conversation map of FIG. 1.
Figure 3B:
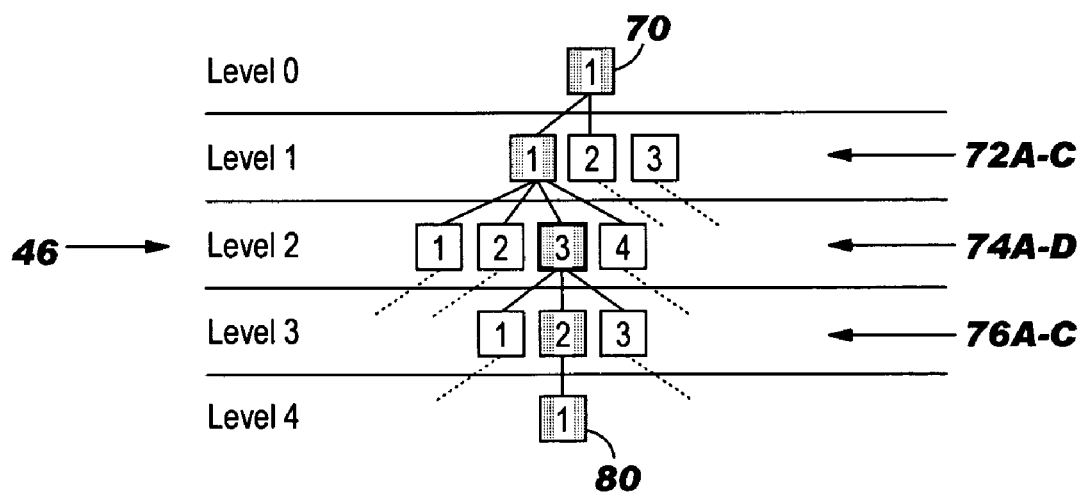
FIG. 3B further illustrates contents of the conversation map of FIG. 1.
Figure 4A:
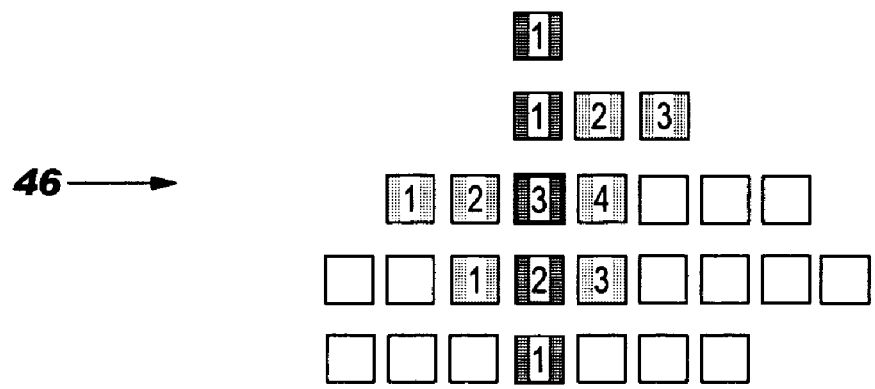
FIG. 4A depicts an extended conversation map according to the present invention.
Figure 4B:
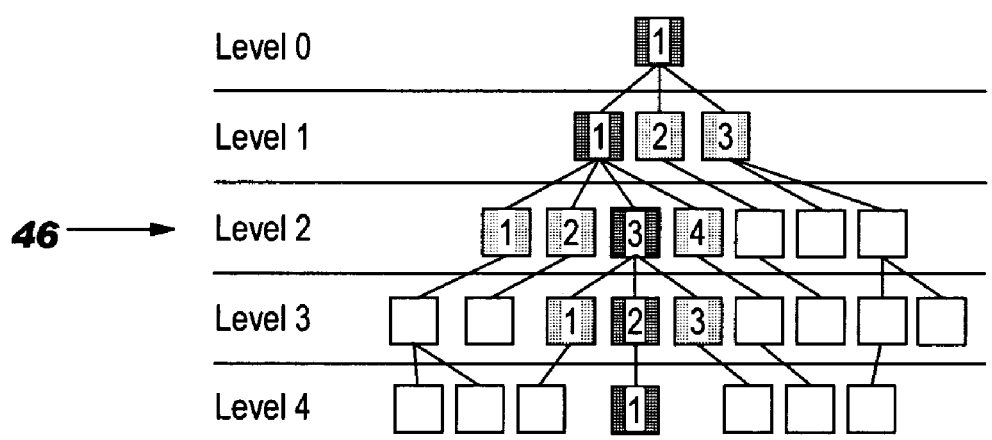
FIG. 4B depicts a tree diagram corresponding to the extended conversation map of FIG. 4A.

Specifically, referring to FIGS. 3A-B, conversation map 46 is more clearly shown. As can be seen, node 70 represents the root of the conversation (i.e., the oldest message) and has three child nodes 72A-C. As further shown, node 72A itself has four child nodes 74A-D. Node 74C is highlighted and represents message 36C of FIG. 2. In addition, node 74C has three child nodes 76A-C, with node 76B having one child node 78. In viewing conversation map 46 of FIG. 3A is can be clearly seen that message 36C (node 74C) has two predecessor messages represented by nodes 72A and 70. As further demonstrated in FIG. 3A, message 36C has two subsequent generations. Knowing the quantity of predecessor and successor messages for each given message can make it easier for a participant to keep track of the multiple branches/topics that can exist within the single conversation. To this extent, conversation map 46 is shown further expanded in FIGS. 4A-B to illustrate that a given conversation can have a complex hierarchy of topics/branches. The conversation map 46 visualizes the hierarchy of the set of messages and supports navigating branches/topics of the conversation. Further, conversation map 46 highlights all the messages displayed in column 34 by stacking them on top of each other (i.e. the messages displayed in column 34 are represented in the map through the highlighted squares in the rectangular area 46A). Conversation map 46 also displays the immediate siblings of these messages. Optionally, conversation map 46 can be expanded to show all messages of a threaded conversation as indicated in FIGS. 4A-B. In any event, conversation map 46 map is interactive and dynamic; its shape changes according to the branch displayed in column 34. The branch displayed in column 34 could be changed by selecting a message in the conversation map, by selecting a message in the column 32, by using the navigation buttons inside column 34, or by other means. Upon selecting a message, the conversation map is updated with the branch displayed in column 34 (i.e. the branch items are displayed in rectangular area 46A and the new corresponding siblings are displayed next to the branch items in map 46).

Referring back to FIG. 2, each message 36A-F in column 32 could further include a content/object type icon such as icons 62 and/or 64 for indicating the type of content (object) posted. As indicated above, postings are not limited to text but can also be diverse representations of other objects, as components of the multi-column user interface, wherein these other objects (such as images, files, links to other documents, links to websites, etc.) may be viewed or worked on directly in the threaded on-line conversation, and may optionally be opened and modified by any of the participants in that conversation. For example, posting 36E represents a spreadsheet file. Content icon 62 can indicate as much to the participants. Each column 32 and 34 could also include fast forward buttons 66, scroll bars 68 for navigating about the columns 32 and 34, and/or a vertical index (time line) 59 where each message is represented by a tick mark positioned at a position proportional to its time stamp in a chronological sequence of the messages. Specifically, the vertical index provides a visual summary of the conversation and can be used to navigate to particular messages. This is so that a series of user inputs in the vertical index moves the first column one message forward or backward in the chronological sequence of messages. The vertical index can indicate through different colors or shades which messages are read or unread.

As indicated above, a single conversation can have multiple branches or topics. As such, keeping track of a single branch/topic can be extremely difficult. To this extent, column 34 is provided to display a branch of messages corresponding to a message selected in column 32. Specifically, when a particular message is selected in column 32, that message will be displayed along with its topical branch or lineage of messages in column 34. For example, as shown, message 36C is selected in column 32. Accordingly, it is displayed in column 34 along with the predecessor and successor messages (represented by the aforementioned nodes in FIGS. 3A-B) of its branch. For example, message 80A could correspond to node 72A, while messages 80B-C correspond to nodes 76B and 78, respectively. The message corresponding to node 70 is out of view in FIG. 2, but could be viewed by manipulating fast forward buttons 66 or scroll bar 68 of column 34. Furthermore, in displaying the branch of messages corresponding to selected message 36C, column 34 (just like column 32) could allow an inline preview of other content (objects) other than text to be displayed. For example, an image 84 could be displayed in message 80A such as a preview of a file inserted into a message in column 32. Inline previews can be optionally interactive allowing people to modify the content.

Similar to column 32, each message displayed in column 34 can each be displayed in a separate message region, and each such message could have an associated message name 57, in-line reply button 56, author icon 58, content/object type icon 62 as well as a set of navigation buttons 82. In general, navigation buttons 82 provide a way to navigate about adjacent hierarchical levels of a particular messages. For example, the navigation buttons 82 on the bottom of message 36C could represent all child messages (direct successors of message 36C, i.e., as represented by nodes 76A-C in FIGS. 3A-B). By selecting (i.e., clicking on) a particular one of navigation buttons 82 for message 36C, a participant can view the corresponding child message. Thus, if a participant clicked on the navigation button labeled—"3" for message 36C, it would display the message corresponding to node 76C of FIGS. 3A-B in the region of message 80B directly underneath message 36C. When this occurs, the parent message 80A remains the same in column 34 and message 80C and subsequent messages in column 34 could be changed to display the branch of messages corresponding to the newly selected message.

Figure 5A:
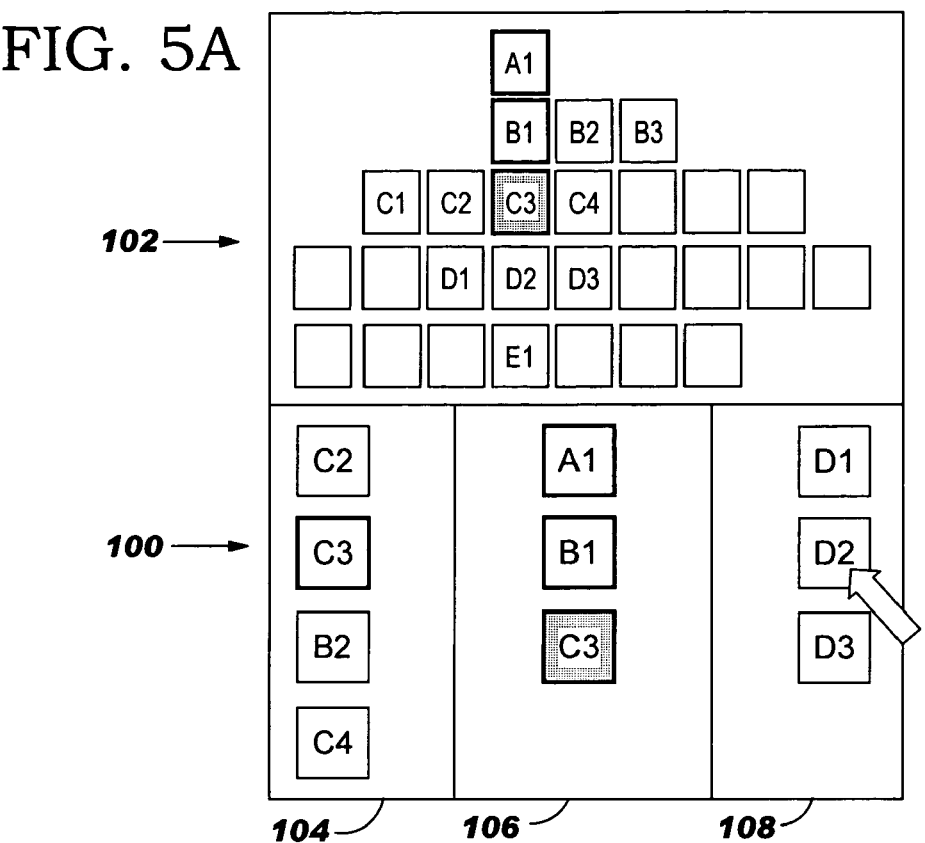
FIG. 5A depicts an illustrative three-column user interface, according to the present invention.
Figure 5B:
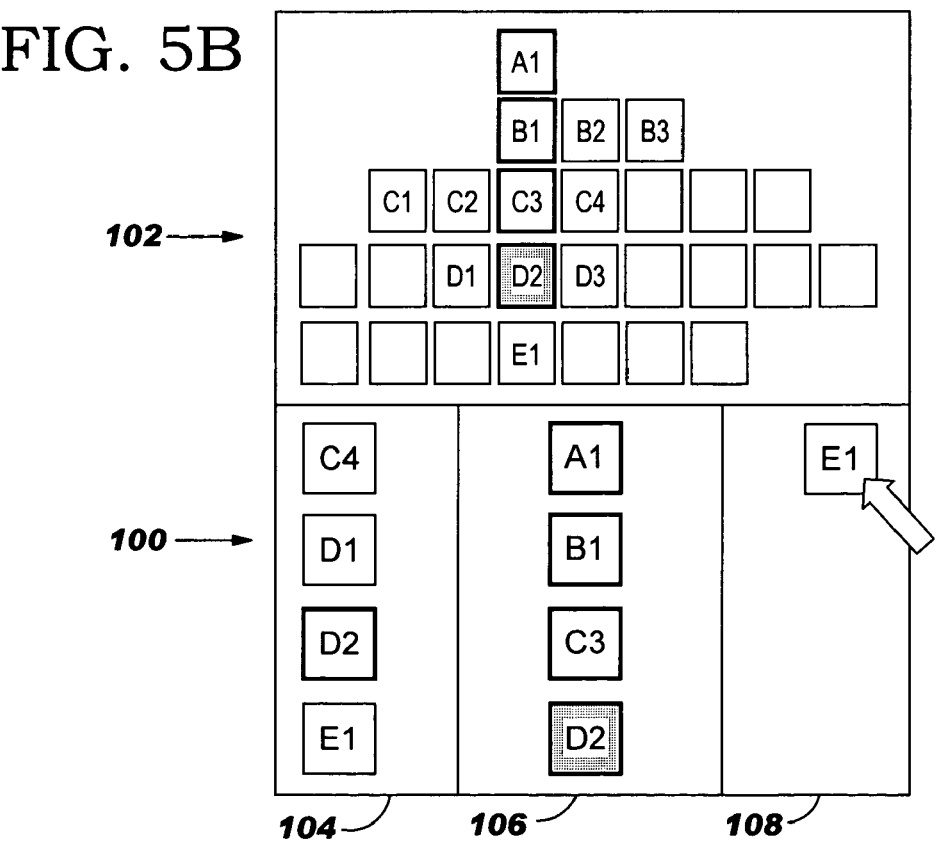
FIG. 5B depicts the three-column user interface of FIG. 5A after selection of a particular message.

It should be understood that the present invention is not limited to a two-column embodiment. Rather, the present invention could provide a user interface that has additional columns, representing additional parallel branches/topics as described above for column 34. An optional instantiation shown in FIGS. 5A-B describes a three-column user interface 100 and an associated conversation map 102. As depicted, user interface 100 includes columns 104, 106 and 108. It should be understood that user interface 100 can include features (e.g., a title, lists, buttons, fields, icons, menus, scroll bars, etc.) similar to user interface 30. Such features have not been shown in FIGS. 5A-B for brevity purposes. In any event, columns 104 and 106 function similar to columns 32 and 34 of user interface 30. Specifically, the messages in the conversation are displayed in column 104 in chronological order. Column 106 displays a branch of messages corresponding to a particular message selected in column 104. However, in user interface 100, column 108 can be provided to display the successor messages (child nodes) corresponding to a selected message in column 106. For example, as shown in FIG. 5A, message C3 was selected in columns 104 and 106. As such, messages D1-D3 (which are successors of message C3) are displayed in column 108. Taking this methodology a step further, if a participant then selected message D2 in column 108, columns 106 and 108 would be altered to appear as shown in FIG. 5B. Specifically, column 106 would now display message D2 as well as its predecessor messages (e.g., A1, B1 and C3). The successor message E1 to message D2 would then be displayed in column 108. As can thus be seen, the additional column 108 of interface 100 provides a functionality similar to the navigation buttons 82 of user interface 30.

Another example for an instantiation of a multi-column user interface could comprise a third column for displaying only messages authored by the same participant as a message selected in the first column and/or second column.

Figure 6A:
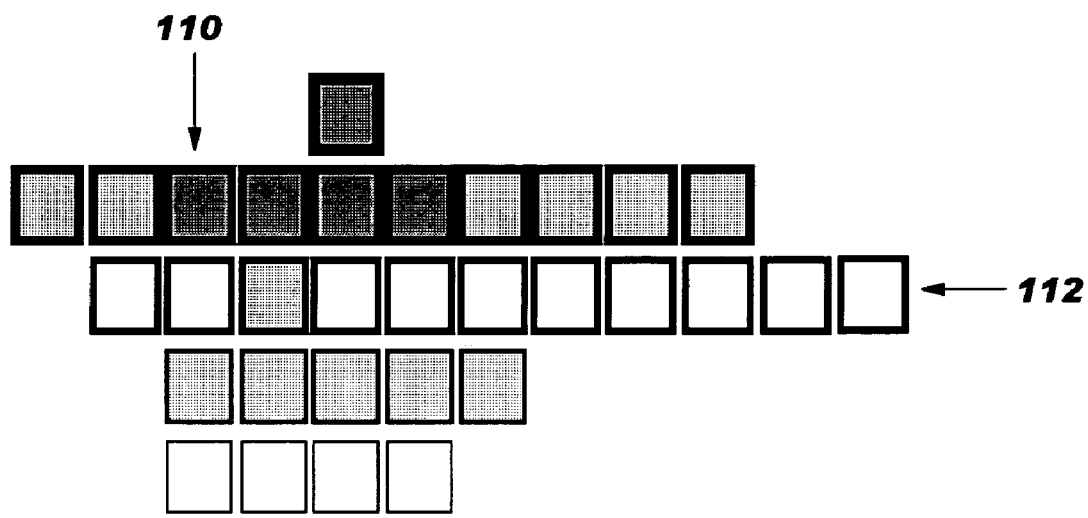
FIG. 6A depicts a display attribute of a conversation map altered in a first manner to express message chronology according to the present invention.
Figure 6B:
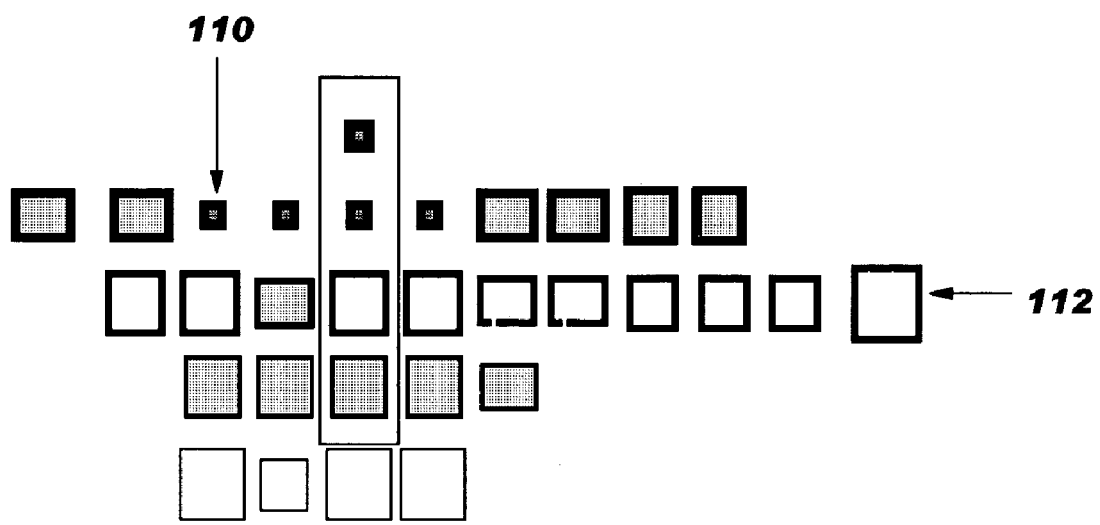
FIG. 6B depicts a display attribute of a conversation map altered in a second manner to express message chronology according to the present invention.

Referring back to FIG. 2, regardless of whether two or more columns are provided, under the present invention, a display attribute of conversation map 46 (i.e., or the hierarchy thereof) could be altered to express certain pieces of information. Specifically, referring to FIGS. 6A-B, an appearance of nodes 110 of conversation map 112 is altered to reflect a time line or chronology of the corresponding messages. In FIG. 6A, the borders nodes 112 are darkened with time. That is, the borders of nodes corresponding to the more recent messages appear lighter than the borders nodes corresponding to the older messages. In FIG. 6B, a size of nodes 112 is altered with time. Specifically, the nodes corresponding to the more recent nodes appear larger than the nodes corresponding to the older messages.

Figure 7A:
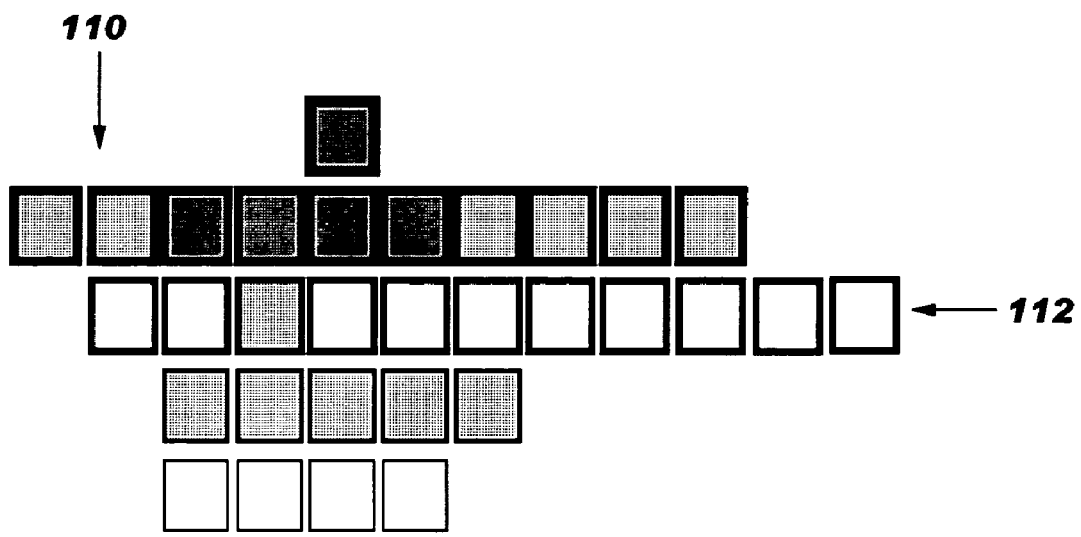
FIG. 7A depicts a display attribute of a conversation map altered in a first manner to express both message chronology and authorship according to the present invention.
Figure 7B:
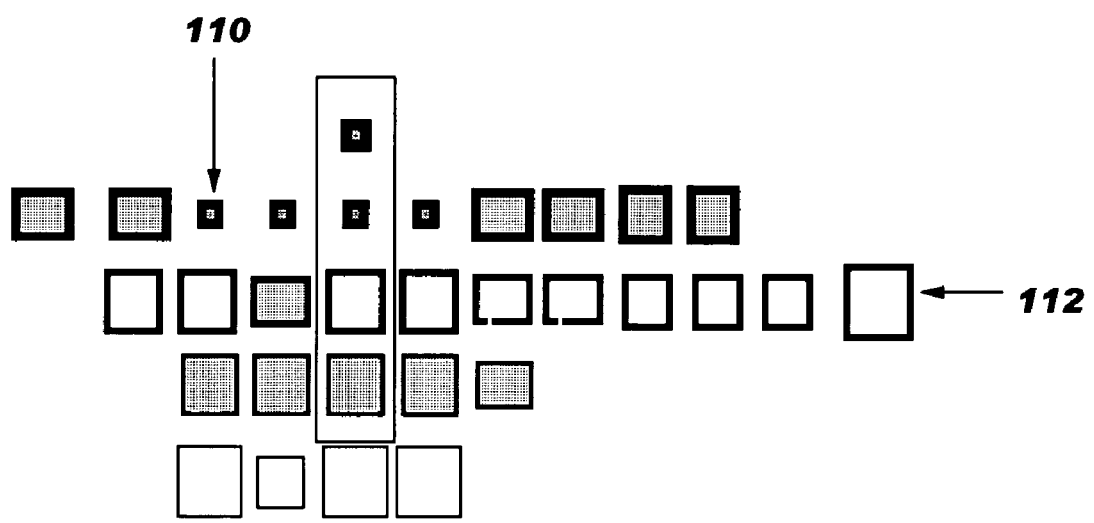
FIG. 7B depicts a display attribute of a conversation map altered in a second manner to express both message chronology and authorship according to the present invention.
Figure 8:
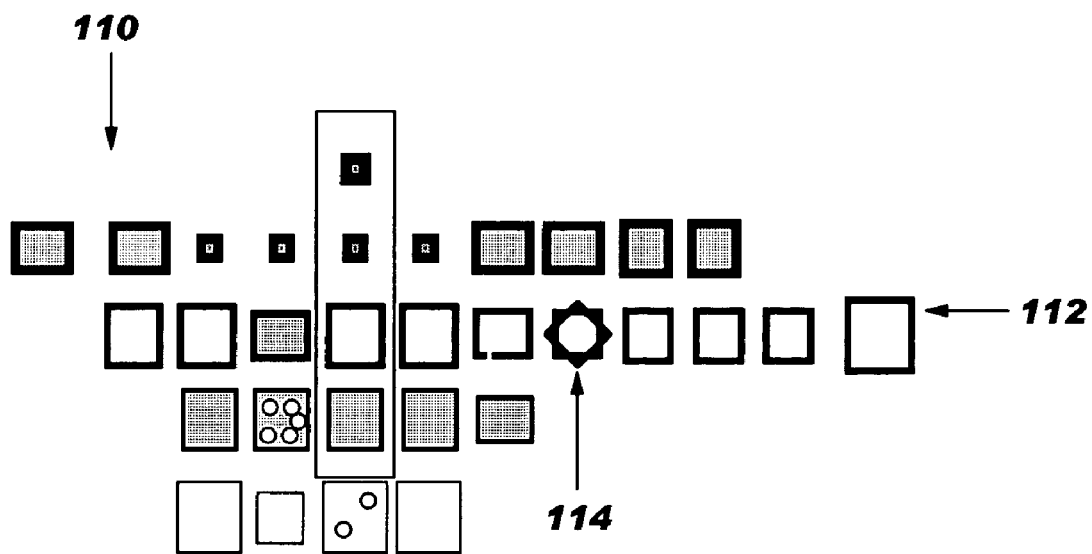
FIG. 8 depicts a conversation map that includes search target indicators according to the present invention.
Figure 9:
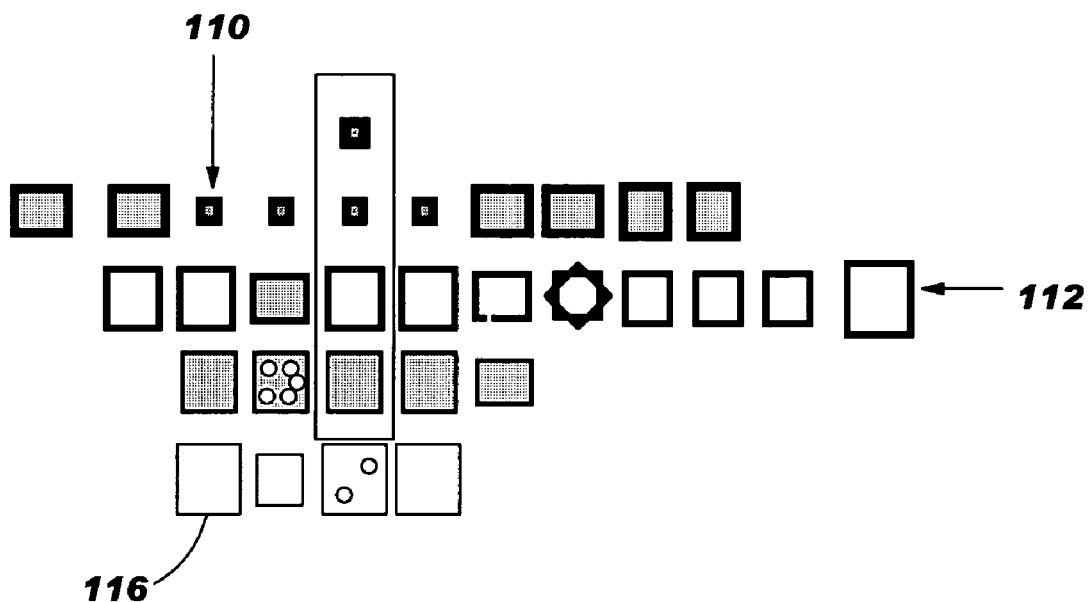
FIG. 9 depicts a display attribute of a conversation map altered to express message read status according to the present invention.

Referring to FIGS. 7A-B the center portions of nodes 112 can be colored or shaded certain ways to reflect authorship. As shown, the center portions can have certain colors and/or shading patterns that can be used to reflect the authors thereof. Since the borders of nodes 112 can be darkened to reflect the time line (as shown in FIG. 6A), both time line and authorship could be represented simultaneously as shown in FIG. 7A. The same holds true when the size of nodes 112 is altered to reflect the time line. Specifically, referring to FIG. 7B, even if nodes corresponding to older messages are shrunk, the center portions thereof can still be colored/shaded to reflect authorship. Still yet, as shown in FIG. 8, if a search capability is supported by conversation program (FIG. 1), the presence of search targets indicators 114 could be provided on nodes 112 in a manner consistent with the display of chronology and authorship. Referring to FIG. 9, nodes 112 could be further altered to reflect a read status of the corresponding messages. For example, nodes corresponding to unread messages could be surrounded by a darkened outline 116.

It should be understood that the present invention can be realized in hardware, software, or a combination of hardware and software. Any kind of computer system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

We claim:

1. A multi-column user interface for managing threaded on-line conversations, comprising:
    a first column for chronologically displaying a set of messages in a conversation;
    a second column for displaying a branch of messages corresponding to a message selected in the first column; and
    a conversation map for illustrating relationships between messages in the conversation, wherein the conversation map changes according to the branch of messages displayed in the second column.

2. The multi-column interface of claim 1, wherein each of the set of messages may comprise content selected from the group consisting of text, images, files, links to other documents and links to websites.

3. The multi-column interface of claim 2, wherein each of the set of message is represented by a name.

4. The multi-column user interface of claim 1, wherein each of the set of messages has an associated content icon indicating a type of content of the set of messages.

5. The multi-column user interface of claim 1, wherein the conversation map illustrates and aids in navigation of a hierarchy of the set of messages in the conversation.

6. The multi-column user interface of claim 5, wherein a display attribute of the conversation map is altered based on a chronology of the set of messages.

7. The multi-column user interface of claim 1, further comprising a list of participants in the conversation.

8. The multi-column user interface of claim 1, further comprising a list of other conversations related to the conversation.

9. The multi-column user interface of claim 1, wherein the second column further includes a set of navigation buttons for navigating about the branch of messages.

10. The multi-column user interface of claim 1, wherein each message in the branch of messages is displayed in a separate region of the second column.

11. The multi-column user interface of claim 1, wherein each message of the set of messages displayed in the first column has an associated indicator for indicating a quantity of predecessors and successors.

12. The multi-column user interface of claim 1, wherein each message of the set of messages includes an associated in-line reply button.

13. The multi-column user interface of claim 1, wherein each message of the set of messages has an associated author icon.

14. The multi-column user interface of claim 1, wherein the first column is additionally represented by a vertical index, and wherein each message of the set of messages is represented in the vertical index at a position proportional to its time stamp in a chronological sequence of the set of messages.

15. The multi-column user interface of claim 14, wherein the vertical index comprises a navigation aid that allows a user to move forward and backward in time to each of the set of messages.

16. The multi-column user interface of claim 14, wherein each in a series of user inputs in the vertical index moves the first column one message forward or backward in the chronological sequence of messages.

17. The multi-column user interface of claim 1, further comprising a third column for displaying hierarchical child messages of a message selected in the second column.

18. The multi-column user interface of claim 1, further comprising a third column for displaying messages authored by a same participant in the conversation as a message selected in the first column.

19. The multi-column user interface of claim 1, further comprising a third column for displaying messages authored by a same participant in the conversation as a message selected in the second column.

20. A multi-column user interface for managing threaded on-line conversations, comprising:
    a first column for chronologically displaying a set of messages in a conversation;
    a second column for displaying a branch of messages corresponding to a message selected in the first column, wherein each message in the branch of messages includes navigation buttons for navigating about adjacent hierarchical levels of the branch of messages; and
    a conversation map for illustrating relationships between messages in the conversation, wherein the conversation map changes according to the branch of messages displayed in the second column.

21. The multi-column user interface of claim 20, wherein the conversation map illustrates and aids in navigation of a hierarchy of the set of messages in the conversation.

22. The multi-column user interface of claim 21, wherein a display attribute of the conversation map is altered based on a chronology of the set messages.

23. The multi-column user interface of claim 20, further comprising a list of participants in the conversation.

24. The multi-column user interface of claim 20, further comprising a list of other conversations related to the conversation.

25. The multi-column user interface of claim 20, wherein each message of the set of messages in the branch of messages is displayed in a separate region of the second column.

26. The multi-column user interface of claim 20, wherein each message of the set of messages has an associated indicator for indicating a quantity of predecessors and successors.

27. The multi-column user interface of claim 20, wherein each message of the set of messages has an associated in-line reply button.

28. The multi-column user interface of claim 20, wherein each message of the set of messages has an associated author icon.

29. The multi-column user interface of claim 20, further comprising a third column for displaying hierarchical child messages of a message selected in the second column.

30. A program product stored on a recordable medium, which when executed, comprises program code for generating a multi-column user interface for managing threaded on-line conversations, wherein the multi-column user interface includes
- a first column for chronologically displaying a set of messages in a conversation,
- a second column for displaying a branch of messages corresponding to a message selected in the first column and
- a conversation map for illustrating relationships between messages in the conversation, wherein the conversation map changes according to the branch of messages displayed in the second column.

31. The program product of claim 30, wherein the conversation map illustrates and aids in navigation of a hierarchy of the set of messages in the conversation.

32. The program product claim 31, wherein a display attribute of the conversation map is altered based on a chronology of the set of messages.

33. The program product of claim 30, wherein the multi-column user interface further includes a list of participants in the conversation.

34. The program product of claim 30, wherein the multi-column user interface further includes a list of other conversations related to the conversation.

35. The program product of claim 30, wherein the second column farther includes a set of navigation buttons for navigating about the branch of messages.

36. The program product of claim 30, wherein each message in the branch of messages is displayed in a separate region of the second column.

37. The program product of claim 30, wherein each message of the set of messages has an associated indicator for indicating a quantity of predecessors and successors.

38. The program product of claim 30, wherein each message of the set of messages has an associated in-line reply button.

39. The program product of claim 30, wherein each message of the set of messages has an associated author icon.

40. The program product of claim 30, wherein the multi-column user interface further includes a third column for displaying hierarchical child messages of a message selected in the second column.

* * * * *